US006957304B2

(12) United States Patent

Wilkerson

(10) Patent No.: US 6,957,304 B2
(45) Date of Patent: Oct. 18, 2005

(54) RUNAHEAD ALLOCATION PROTECTION (RAP)

(75) Inventor: Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 09/745,020

(22) Filed: Dec. 20, 2000

(65) Prior Publication Data

US 2002/0116584 A1 Aug. 22, 2002

(51) Int. Cl.[7] ................................................ G06F 12/16

(52) U.S. Cl. ....................... 711/137; 711/204; 711/213; 712/207; 712/230

(58) Field of Search ................................ 711/137, 204, 711/213, 133, 141, 144, 145; 712/207, 230, 244

(56) References Cited

U.S. PATENT DOCUMENTS 5,920,889 A * 7/1999 Petrick et al. ............. 711/143
5,983,324 A * 11/1999 Ukai et al. .................. 711/137

OTHER PUBLICATIONS

Microsoft Computer Dictionary, 1999, Microsoft Press, Fourth Edition, p. 111.*

Dundas, J., et al., "Improving Data Cache Performance by Pre–executing Instructions Under a Cache Miss", *Proceedings of the 1997 International Conference on Supercomputing*, 68–75, (1997).

* cited by examiner

*Primary Examiner*—Mano Padmanabhan
*Assistant Examiner*—Midys Inoa
(74) *Attorney, Agent, or Firm*—Schwegman, Lundberg, Woessner & Kluth, P.A.

(57) ABSTRACT

A method and apparatus are described for protecting cache lines allocated to a cache by a run-ahead prefetcher from premature eviction, preventing thrashing. The invention also prevents premature eviction of cache lines still in use, such as lines allocated by the run-ahead prefetcher but not yet referenced by normal execution. A protection bit indicates whether its associated cache line has protected status in the cache or whether it may be evicted.

31 Claims, 12 Drawing Sheets

RUNAHEAD ALLOCATION PROTECTION (RAP)

TECHNICAL FIELD OF THE INVENTION

Generally, the present invention relates to memory system architecture and, in particular, the present invention relates to cache design.

BACKGROUND

The speed at which computer processors can execute instructions continues to outpace the ability of computer memory systems to supply instructions and data to the processors. Consequently, many high-performance computing systems provide a high-speed buffer storage unit, commonly called a cache or cache memory, between the working store or memory of the central processing unit ("CPU") and the main memory.

A cache comprises one or more levels of dedicated high-speed memory holding recently accessed data, designed to speed up subsequent access to the same data. For the purposes of the present specification, unless specified otherwise, data will refer to any content of memory and may include, for example, instructions, data operated on by instructions, and memory addresses. Cache technology is based on the premise that computer programs frequently reuse the same data. Generally, when data is read from main system memory, a copy of the data is saved in the cache memory, along with an index to the associated main memory. For subsequent data requests, the cache detects whether the data needed has already been stored in the cache. For each data request, if the data is stored in the cache (referred to as a "hit"), the data is delivered immediately to the processor while any attempt to fetch the data from main memory is not started or aborted if already started. On the other hand, if the requested data is not stored in the cache (referred to as a "miss") then it is fetched from main memory and also saved in the cache for future access.

A level 1 cache ("L1") generally refers to a memory bank built closest to the central processing unit ("CPU") chip, typically on the same chip die. A level 2 cache ("L2") is a secondary staging area that feeds the L1 cache. L2 may be built into the CPU chip, reside on a separate chip in a multichip package module, or be a separate bank of chips.

Address predictors are used to anticipate or predict future addresses in applications such as data prefetching or instruction scheduling. Prefetching systems and methods attempt to reduce memory latency by reducing the probability of a cache miss. The probability of a cache miss is reduced by anticipating or predicting what information will be requested before it is actually requested.

One type of prefetcher used to decrease the impact of cache misses on processor performance is referred to herein as a run-ahead prefetcher. The run-ahead prefetcher is independently sequenced and is allowed to progress an arbitrary distance ahead of the processor. In particular when the processor stalls, the run-ahead prefetcher can continue to operate.

Since the sequencing of run-ahead prefetching is done independently of the processor's program sequencing, it is possible for the run-ahead prefetcher to overflow in the cache. Two types of overflows can occur, the first is referred to as prefetch overflow. Prefetch overflow occurs when the run-ahead prefetcher makes allocations that cause older prefetches to be replaced. This would occur if the number of entries in the cache is N, but the run-ahead prefetcher has made N+1 allocations that have not yet been referenced by the processor. Normal Least Recently Used (LRU) replacement would cause the oldest element (the first allocation) to be replaced by the new N+1 allocation. The second type of overflow occurs when an allocation initiated by the run-ahead prefetcher replaces a cache line allocated during normal execution that is still in use.

Ultimately, overflow detracts from the benefit provided by the run-ahead prefetcher. In the worst case, overflow completely eliminates the benefit of the run-ahead prefetcher or even degrades performance. What is needed is a run-ahead prefetcher with the capability to execute further ahead of the normal thread to expose more cache misses, while preserving the benefits of past allocations.

DETAILED DESCRIPTION

Figure 1:
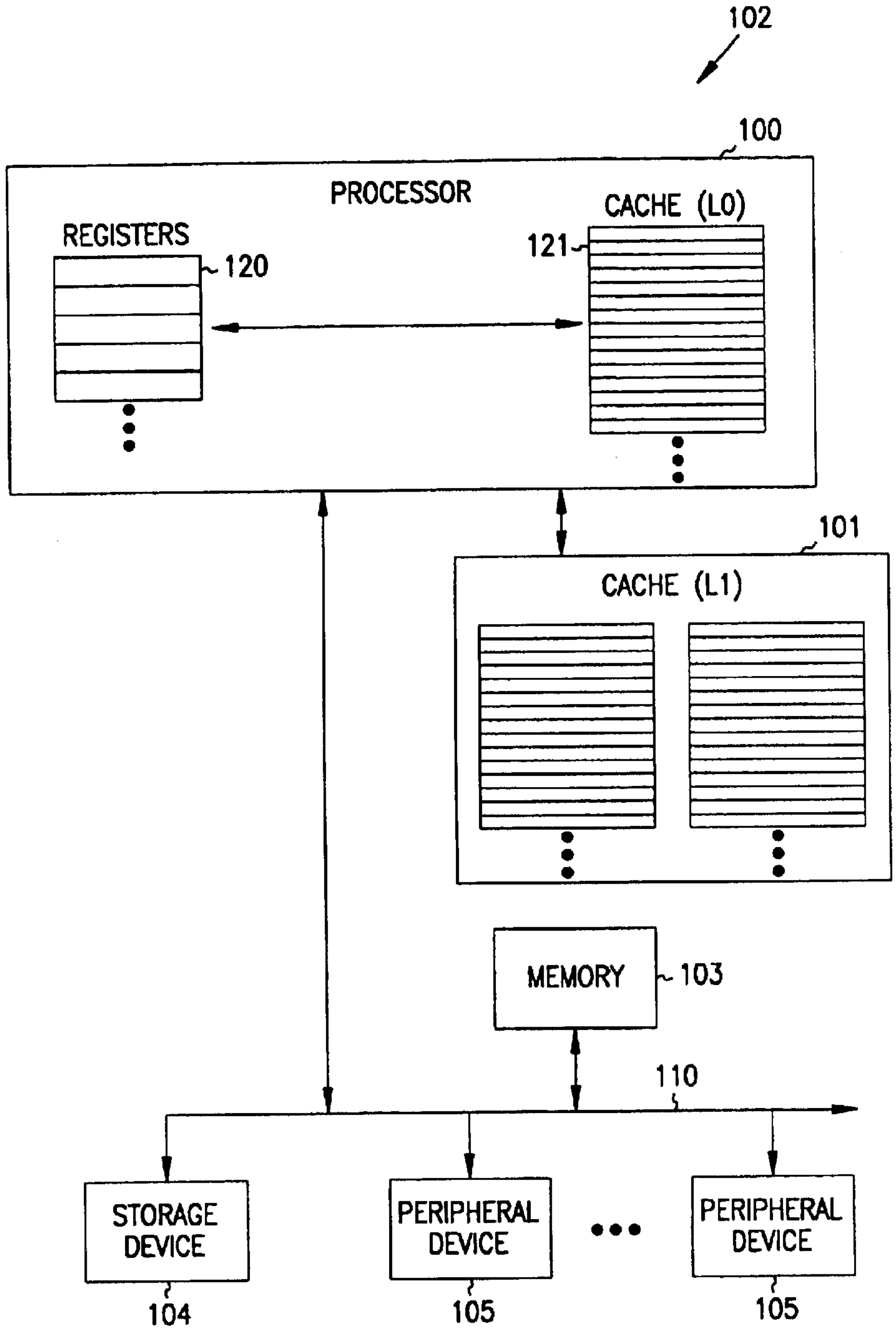
FIG. 1 shows a block diagram of a system in which example embodiments of the invention can be implemented

A novel method and apparatus are described for protecting cache lines from premature eviction after the cache lines were allocated by a run-ahead prefetcher. In the following detailed description of the invention reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The apparatus and method of example embodiments of the invention prevents premature eviction of cache lines allocated to a cache by a run-ahead prefetcher but not yet referenced by normal execution. This improves the run-ahead prefetcher performance by ensuring that it will not evict blocks that will be needed later in normal execution, thus reducing the number of misses seen in normal execution.

FIG. 1 is a block diagram of a system, such as a computer system 102, in which example embodiments of the invention can be implemented. The computer system 102 comprises a processor 100, a cache 101, a memory 103, a storage device 104, one or more peripheral devices 105 and bus 110. Processor 100 includes a set of registers 120 and an L0 cache 121. A register is a temporary storage area within a processor for holding arithmetic and other results used by the processor. Registers are individually comprised of bits. A bit is a binary digit and represents either a "0" value or a "1" value. Different registers may be used for different functions. For example, general purpose registers are used interchangeably to hold operands for logical and arithmetic operations.

The processor is coupled to an external L1 cache 101. The processor is also coupled to bus 110 which is coupled to memory 103, storage device 104, and peripheral devices 105. Processor 100 of FIG. 1 includes circuitry to transfer data between registers 120 and L0 cache 121. Because L0 cache 121 is a dedicated bank of memory locations located inside processor 100, the transfer of data between registers 120 and L0 cache 121 can be done across a very wide, short, high speed bus. As a result, loading data from L0 cache 121 into one of registers 120 occurs very quickly. In contrast, L1 cache 101, though dedicated to processor 100, requires that communication with the processor be conducted across a longer, narrower bus, with bus interface circuitry slowing the link between the two devices. As a result, loading data from L1 cache 101 into one of registers 120 occurs more slowly than loading data from L0 cache 121 into registers 120.

The memory storage capacity of L1 cache 101 of FIG. 1, however, is much larger than L0 cache 121. It is the nature of this computer system memory hierarchy that although memory banks located progressively farther from the processor are progressively slower for the processor to access, the memory banks have progressively larger memory storage capacities. Memory 103 of FIG. 1 is further from processor 100 than both L0 cache 121 and L1 cache 101, and it takes longer for processor 100 to load data from memory 102 than from either the L0 or L1 caches. The memory storage capacity of memory 103, however, is larger than the capacity of either L0 cache 121 or L1 cache 101. For one embodiment of the present invention, memory 103 is the main memory of the computer system and comprises dynamic random access memory (DRAM) technology while L0 and L1 caches, 121 and 101, comprise static random access memory (SRAM) technology. Storage device 104 of FIG. 1 is located further from processor 100 in the memory hierarchy than memory 103. Storage device 104 takes longer for processor 100 to access, but the storage device has a much larger memory capacity than memory 103. For one embodiment of the present invention, storage device 104 is an electronic storage medium such as a floppy disk, hard drive, CD-ROM, or DVD.

In accordance with the embodiment of the present invention shown in FIG. 1, before necessary data is loaded from L0 cache 121 into one of registers 120, the data is prefetched from L1 cache 101 and stored in L0 cache 121. For an alternate embodiment of the present invention, data is prefetched from any other memory location in the memory hierarchy of the computer and is stored in a memory location closer to the processor. For example, data may be prefetched from memory 103 and stored in L1 cache 101, or prefetched from memory 103 and stored in L0 cache 121, or prefetched from storage device 104 and stored in L1 cache 101. For an alternate embodiment of the present invention, one or more additional levels are included in the memory hierarchy of the computer system, such as an L2 cache or a network storage device. For another embodiment, fewer levels are included.

In accordance with one embodiment of the present invention, processor 100 of FIG. 1 executes instructions in a normal mode. If the processor stalls in the normal mode of execution, a prefetcher continues to execute instructions in a run-ahead mode with run-ahead allocation protection according to the example embodiments described below.

FIGS. 2A–2D show flow charts of example embodiments of a method of speculative execution. Speculative execution improves cache performance by pre-executing future instructions when a cache miss occurs, making use of otherwise idle execution logic. The pre-fetched instructions generate fairly accurate data prefetches into the cache. This technique is called run-ahead processing, which differs from simple sequential pre-fetching.

Figure 2A:
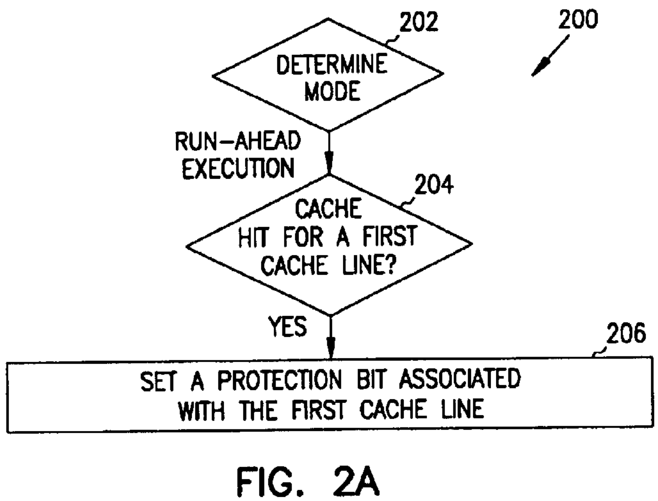
FIGS. 2A–2D show flow charts of example embodiments of a method of speculative execution.

One aspect of the present invention, shown in FIG. 2A, is a method of speculative execution 200 that comprises determining whether a mode is run-ahead execution or normal execution 202, and upon a cache hit for a first cache line during run-ahead execution 204, setting a protection bit associated with the first cache line 206. When the processor is in normal mode, the processor executes valid instructions and the register results are valid. As an example, a cache miss in normal mode may cause the processor to enter run-ahead execution mode. When a processor is in run-ahead execution mode, it pre-executes future instructions. However, run-ahead execution does not generate valid register results. Run-ahead execution mode is sometimes called scratch mode and normal mode is sometimes called retire mode. While in run-ahead mode, allocations to a cache are protected from being pushed out of the cache with protection bits associated with cache lines. A protection bit indicates whether its associated cache line has protected status in the cache or whether it may be evicted. When the protection bit is set, the associated cache line is protected and when the protection bit is clear, the associated cache line is unprotected.

Figure 2B:
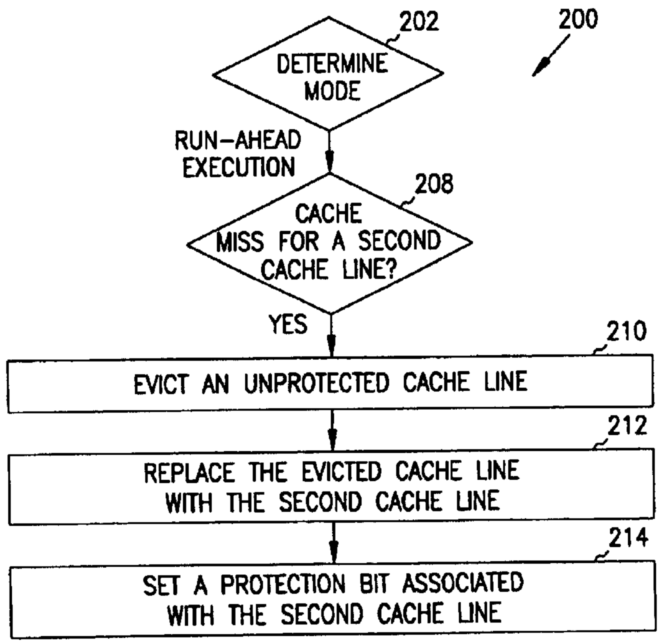

In one embodiment of the present invention, shown in FIG. 2B, the method 200 further comprises evicting an unprotected cache line 210, upon a cache miss for a second cache line during run-ahead execution 208. Upon a cache miss for a second cache line during run-ahead execution 208, in one embodiment, the method 200 further comprises replacing the evicted cache line with the second cache line 212 and setting a protection bit associated with the second cache line 214. Thus, during run-ahead execution, unprotected lines are evicted from the cache to make room for new allocations for cache misses. The new allocations are protected using an indicator, such as a protection bit according to example embodiments of the invention.

Figure 2C:
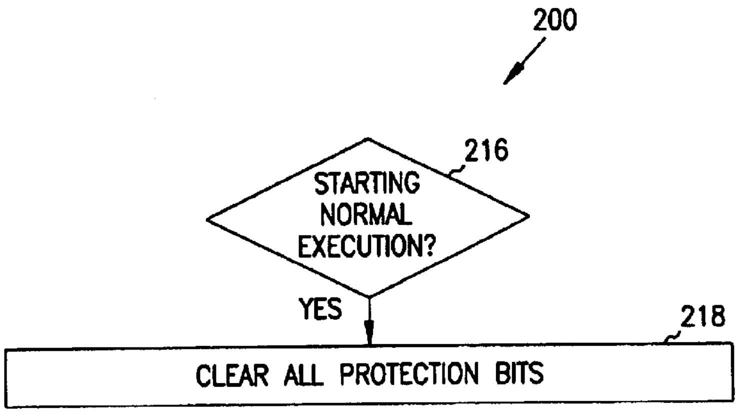
Figure 2D:
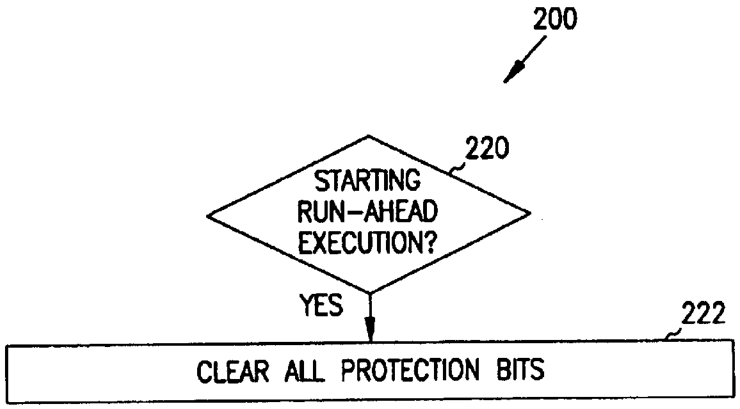

As shown in FIGS. 2C and 2D, the method 200 further comprises clearing all protection bits 218, 222, upon starting normal execution 216 (FIG. 2C) or upon starting run-ahead execution 220 (FIG. 2D). Whether the protection bits are cleared upon entering run-ahead execution or upon returning to normal execution is a matter of implementation choice. When all of the protection bits are cleared, the cache lines are all unprotected.

In one embodiment, when a processor is in normal execution mode and a cache miss initiates run-ahead execution mode, the cache line associated with that initiating cache miss is protected. Once the data for the cache miss is retrieved from main memory, the cache entry can be updated. Once the data for the cache miss is retrieved, the processor exits run-ahead execution and resumes normal execution. During run-ahead mode, the cache is filled with data likely to be used once normal execution resumes. However, data that is stored in the cache during run-ahead execution needs to be protected from the processor running ahead so far ahead that it overwrites some of it. Also, data currently being used by the normal thread of execution also needs to be protected. In this way, fairly accurate data prefetches are generated and allocated into the cache by pre-executing future instructions while data cache misses are outstanding.

Figure 3:
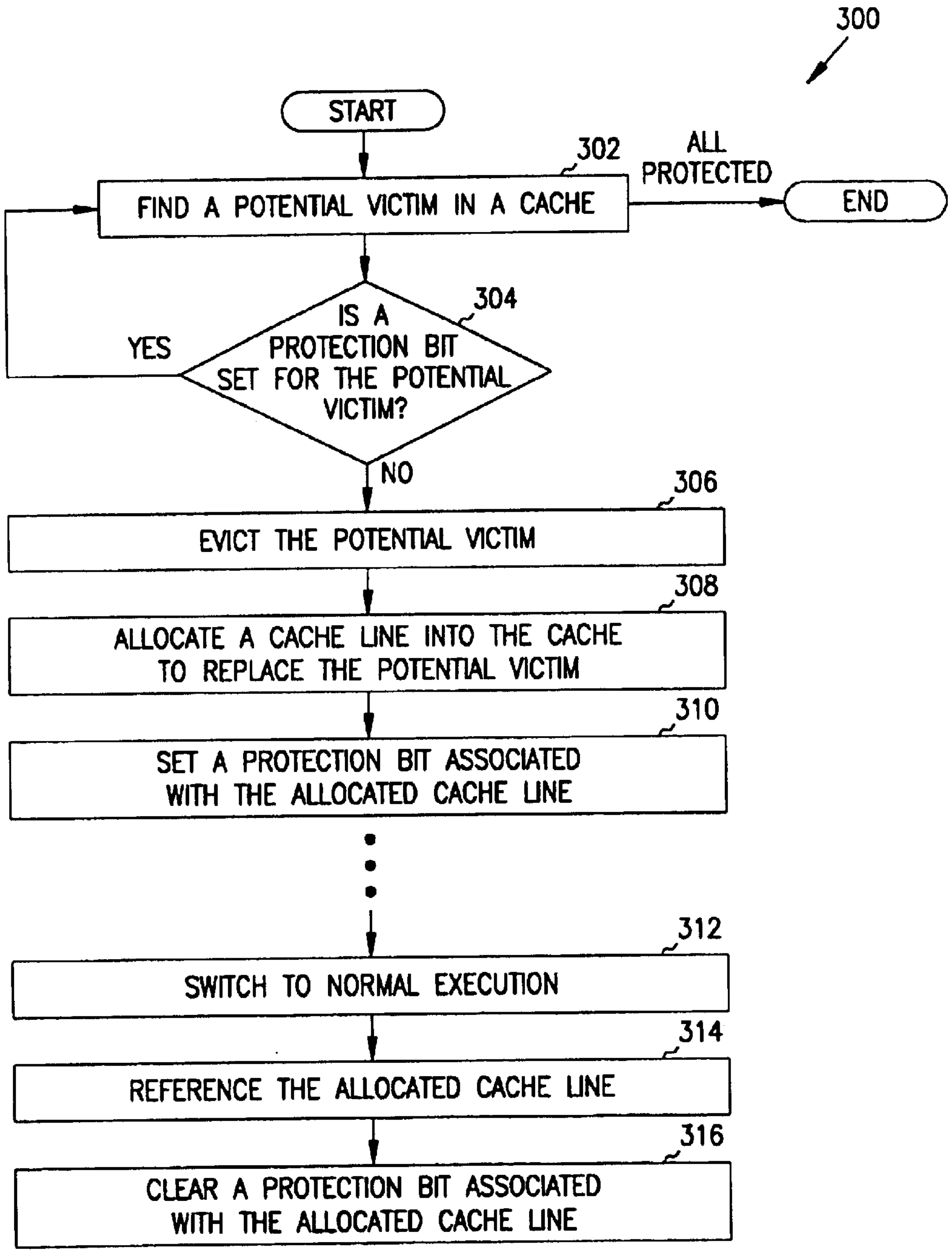
FIG. 3 shows a flow chart of an example embodiment of a method of replacing cache lines during run-ahead execution.

FIG. 3 shows a flow chart of an example embodiment of a method of replacing cache lines during run-ahead execution. One aspect of the present invention is a method of replacing cache lines during run-ahead execution 300 comprising: finding a potential victim in a cache 302, determining whether a protection bit is set for the potential victim 304, and evicting the potential victim only if the protection bit is clear 306. A method of replacing cache lines includes a replacement algorithm. A replacement algorithm determines which cache line is removed from a cache in response to a cache miss cycle. Some examples of replacement algorithms are least recently used (LRU), random, pseudo-least recently used, and others. A potential victim may be a piece of stale data or any other data that is no longer needed by the processor and may be overwritten. A potential victim may be protected or unprotected, as indicated by its associated protection bit.

In one embodiment, the method 300 further comprises allocating a cache line into the cache to replace the potential victim 308, and setting a protection bit associated with the allocated cache line 310. Lines allocated during run-ahead execution are protected from eviction. This prevents the run-ahead prefetcher from evicting earlier prefetched lines that will be useful, once normal execution is resumed. This also prevents the run-ahead prefetcher from running too far ahead. In one embodiment, the run-ahead prefetcher is capable of executing about 10,000 instructions while waiting for a memory reference.

In one embodiment, the method 300 further comprises switching to normal execution 312, referencing the allocated cache line 314, and clearing the protection bit associated with the allocated cache line 316. At some point during run-ahead execution the processor may switch to normal execution. For example, once the data is retrieved for the cache miss that initiated run-ahead execution, the processor switches to normal execution. Then, when a cache line is referenced by normal execution, its protection bit is cleared so that it is unprotected and free to be used in future allocations by the run-ahead prefetcher. Thus, clearing protection bits makes room in the cache for more run-ahead prefetching.

Figure 4A:
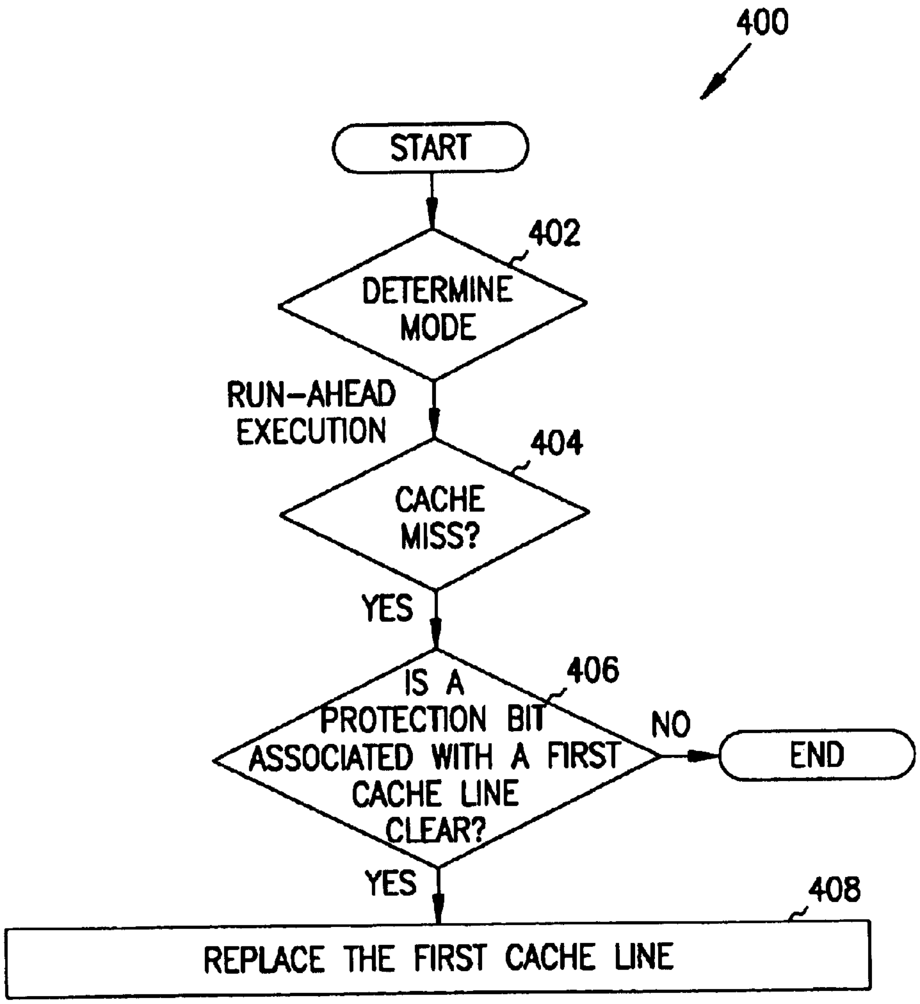
FIGS. 4A–4C show flow charts of example embodiments of a method of accessing a cache.
Figure 4B:
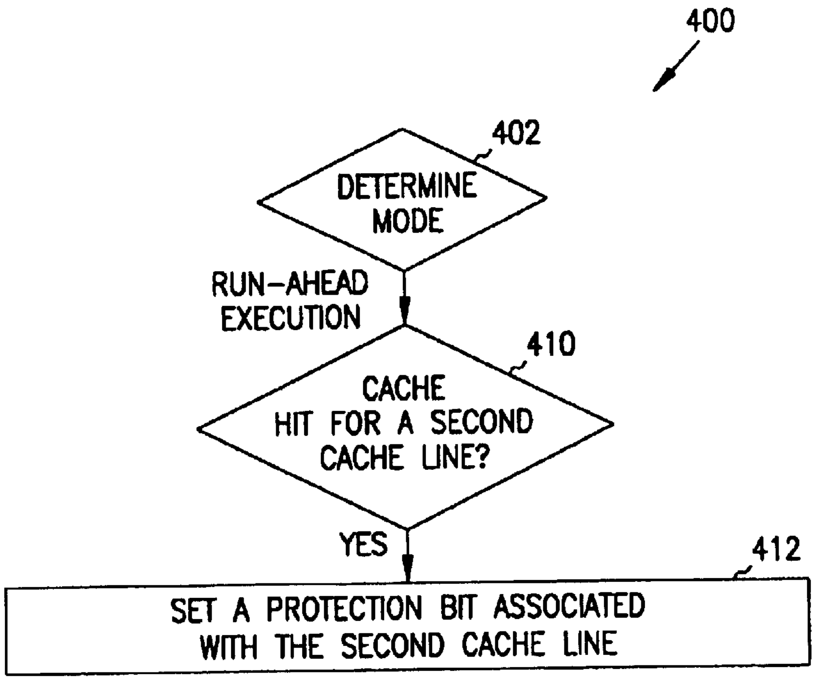
Figure 4C:
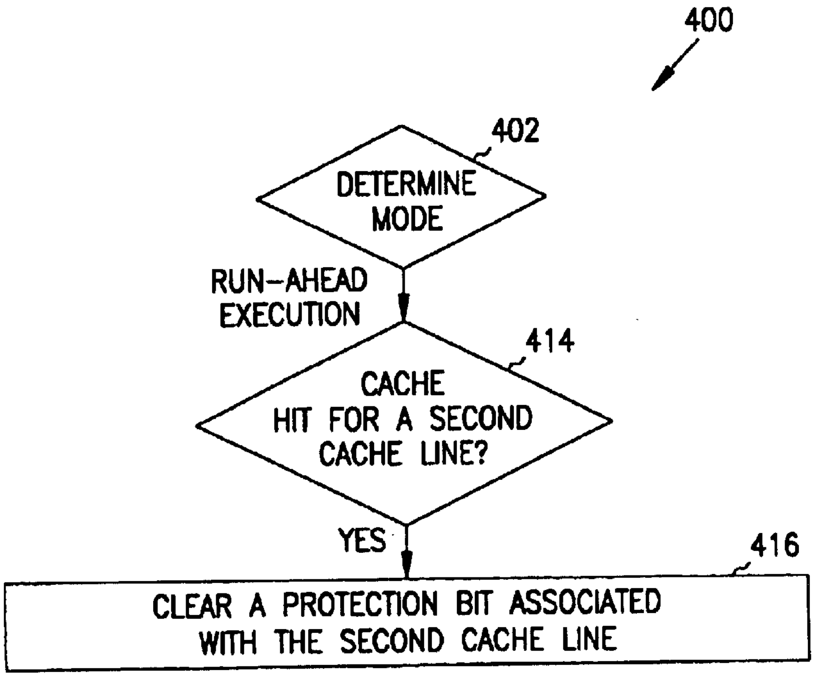

FIGS. 4A–4C show flow charts of example embodiments of a method of accessing a cache. One aspect of the present invention is a method of accessing a cache 400, shown in FIG. 4A, comprising determining whether a mode is run-ahead execution or normal execution 402, and replacing a first cache line 408 upon a cache miss 404 during run-ahead execution only if a protection bit associated with the first cache line is clear 406. Run-ahead allocation protection prevents cache lines prefetched earlier by the run-ahead prefetcher from being evicted as well as preventing cache lines currently in use by normal execution from being evicted. These cache lines are protected by protection bits.

As shown in FIG. 4B, one embodiment of the method 400 further comprises setting a protection bit associated with the second cache line 412 upon a cache hit for a second cache line 410 during run-ahead execution. In one embodiment (shown in FIGS. 4A and 4B) the protection bit is set upon both cache hits and cache misses during run-ahead mode.

As shown in FIG. 4C, one embodiment of the method 400 further comprises upon a cache hit for a second cache line during normal execution 414, clearing a protection bit associated with the second cache line 416. In this embodiment, the cache lines initially protected in run-ahead mode are later unprotected after being referenced in normal mode. Consequently, run-ahead execution fills the cache with future data for reference in normal execution and as it is referenced the data is removed to make room for the next run-ahead prefetching.

Figure 5:
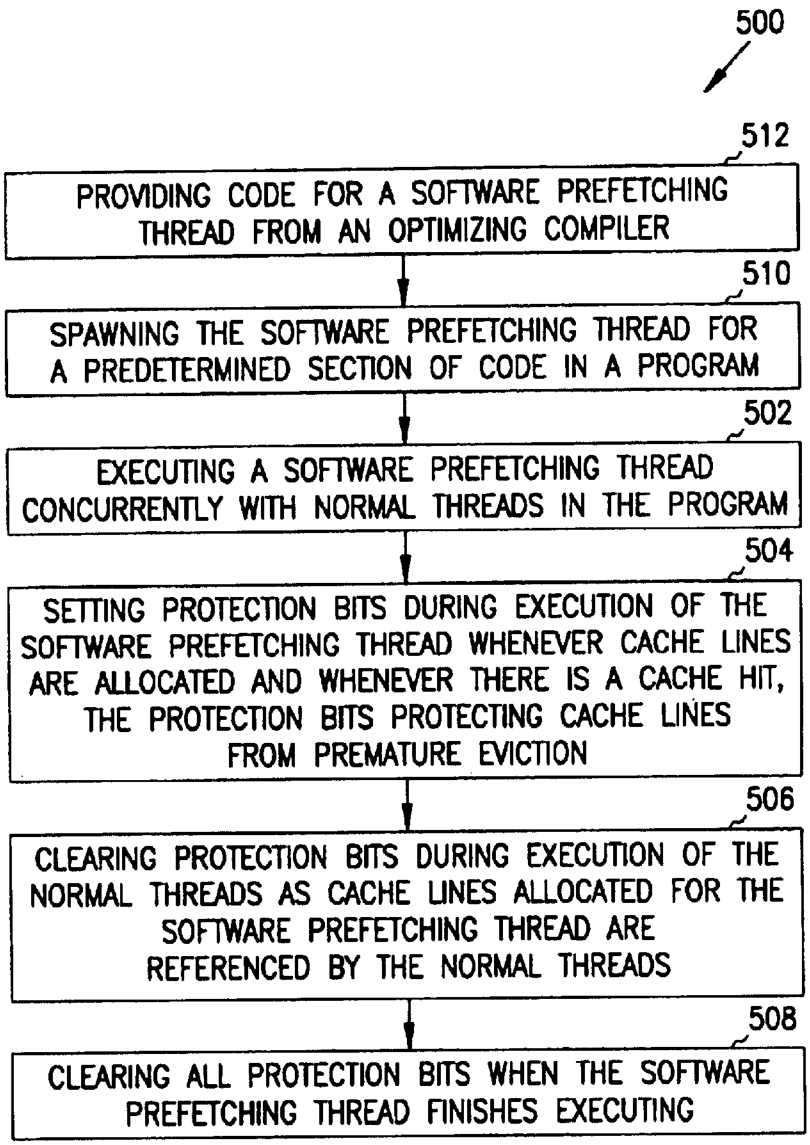
FIG. 5 shows a flow chart of an example embodiment of a method of executing a software prefetching thread on a multithreaded processor.

FIG. 5 shows a flow chart of an example embodiment of a method of executing a software prefetching thread on a multithreaded processor. One aspect of the present invention is a method of executing a software prefetching thread on a multithreaded processor 500. The method 500 comprises executing a software prefetching thread concurrently with normal threads in a program 502, setting protection bits during execution of the software prefetching thread whenever cache lines are allocated and whenever there is a cache hit 504, and clearing protection bits during execution of the normal threads as cache lines allocated for the software prefetching thread are referenced by the normal threads 506. The protection bits protect cache lines from premature eviction. One example of a software prefetching thread is taking a part of the program that misses the cache a lot, such as a loop striding down an array and making it into a thread separate from the program. The software prefetching thread may be simplified and have approximations. In some embodiment, the software prefetching thread is created by an optimizing compiler; in other embodiments, the software prefetching thread is created manually. A software prefetching thread performs prefetching for the processor. While the software prefetching thread is executed, allocations are protected. Once normal execution resumes and the cache entries created by the software prefetching thread are referenced, they are unprotected and free to be used again. In this way, the software prefetching thread produces cache entries that are consumed during normal execution.

In one embodiment, the method 500 further comprises clearing all protection bits when the software prefetching thread finishes executing 508. In one embodiment, the method 500 further comprises spawning the software prefetching thread for a predetermined section of code in the program 510. In one embodiment, the method 500 further comprises providing code for a software prefetching thread from an optimizing compiler 512.

An example embodiment of the present invention is illustrated by pseudocode shown in Table 1. This method, which is invoked for each cache access, is a technique for preventing thrashing in a cache augmented with a run-ahead prefetcher. Experiments have shown that this technique is successful at preventing the cache from thrashing even in the presence of very aggressive prefetchers. As memory latencies grow to several thousand instructions, independently sequenced prefetchers will become more common. As run-ahead prefetchers become more common, this technique to prevent the independently sequenced prefetcher from getting too far ahead of the program's thread of execution will be even more useful.

TABLE 1

```
struct cache_line_struct{
    unsigned long tag; /* line tag */
    char valid; /* valid bit */
```

TABLE 1-continued

```
    char dirty; /* dirty bit */
    char protected; /* protection bit */
    char *data; /* line data */
} line;
struct cache_set_struct{
    line lines[NUM_ASSOC]; /* lines[0] = LRU, lines[NUM_ASSOC-1] = MRU */
} cache_set;
struct cache_struct{
    cache_set sets[NUM_CACHE_SETS];
} cache;
cache c;
char* /* return line data */
do_cache_access(unsigned long addr, /* address of access */
                int TOA, /* type of access RD/WR */
                int run_ahead, /* 1 = run ahead mode, 0 = normal mode */
                char* data /* for writes */
               ) {
unsigned long tag = GET_TAG(addr);
unsigned int set = GET_SET(addr);
unsigned line *1 = find_line_in_set(tag, c.sets[set]);
unsigned line *repl;
if(!run_ahead) {
    if (1) { /* if a hit */
        1->protected = 0;
        update_LRU(c.sets[set], 1); /* place 1 at the head of LRU list */
        if(TOA == RD) /* read */
            return 1->data;
        else { /* write */
            1->dirty = 1;
        return 1->data = data;
        }
    } else { /* miss */
        repl = &(c.sets[set].lines[0]); /* replace LRU block */
        process_miss(addr, TOA, run_ahead, data.repl);
        return MISS;
    }
} else { /* in run_ahead mode */
    if (1) { /* if a hit */
        1->protected = 1;
        update_LRU(c.sets[set], 1);
        if (TOA == RD) /* read */
            return 1->data;
        else /* write */
            return 0; /* do nothing */
    } else { /* miss */
            repl = NULL;
            /* find LRU non-protected block */
            for (int I = 0; i<NUM_ASSOC; I++)
                if (c.sets[set].lines[i].protected == 0) {
                    repl = &(c.sets[set].lines[i]);
                    break;
                }
            if (rep1 == NULL) { /* no non-protected blocks */
                return MISS; /* just return */
            } else {
                process_miss(addr, TOA, run_ahead, data, rep1);
                return MISS;
            }
        }
    }
}
```

Figure 6A:
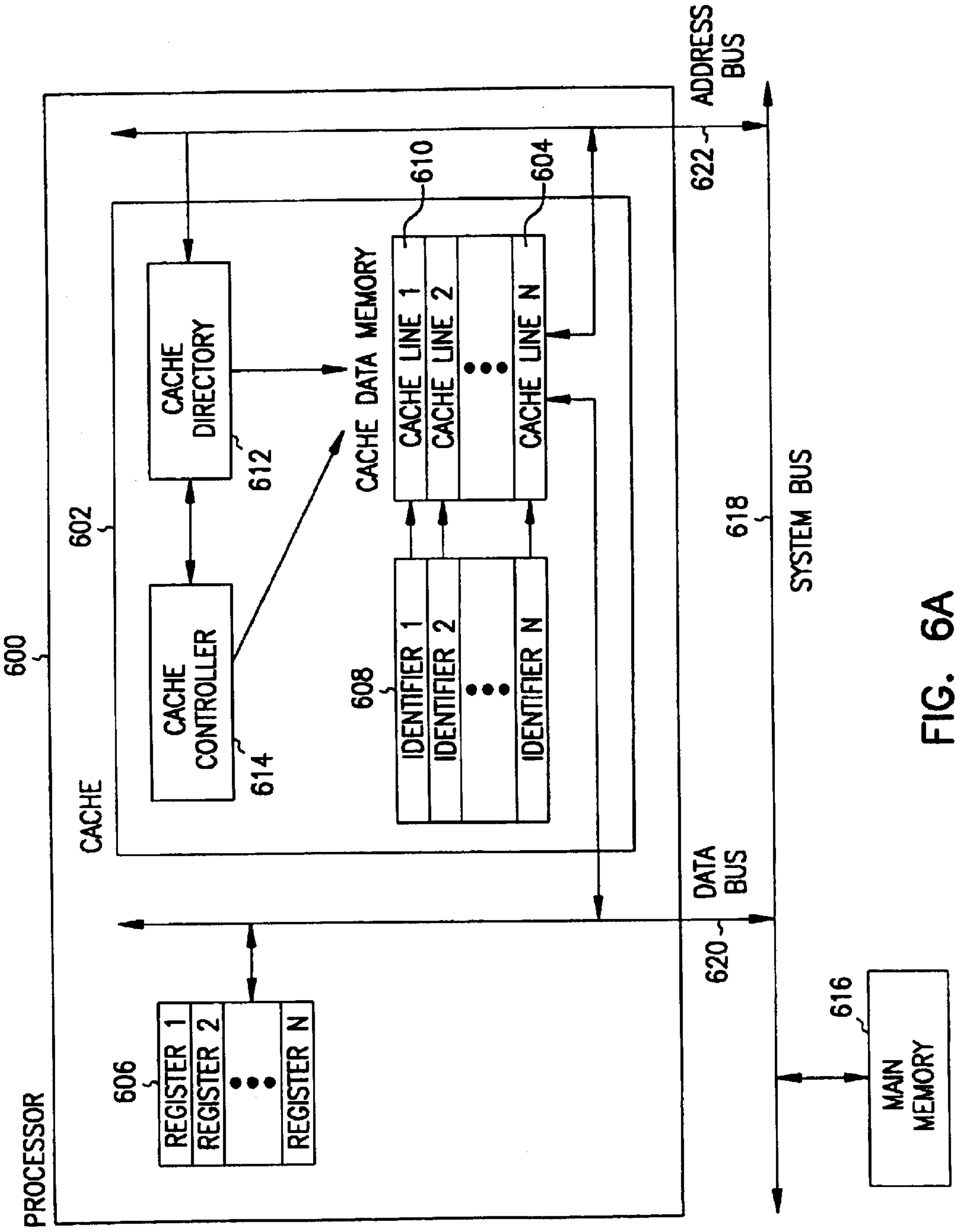
FIGS. 6A–6C show block diagrams of example embodiments of a processor.
Figure 6B:
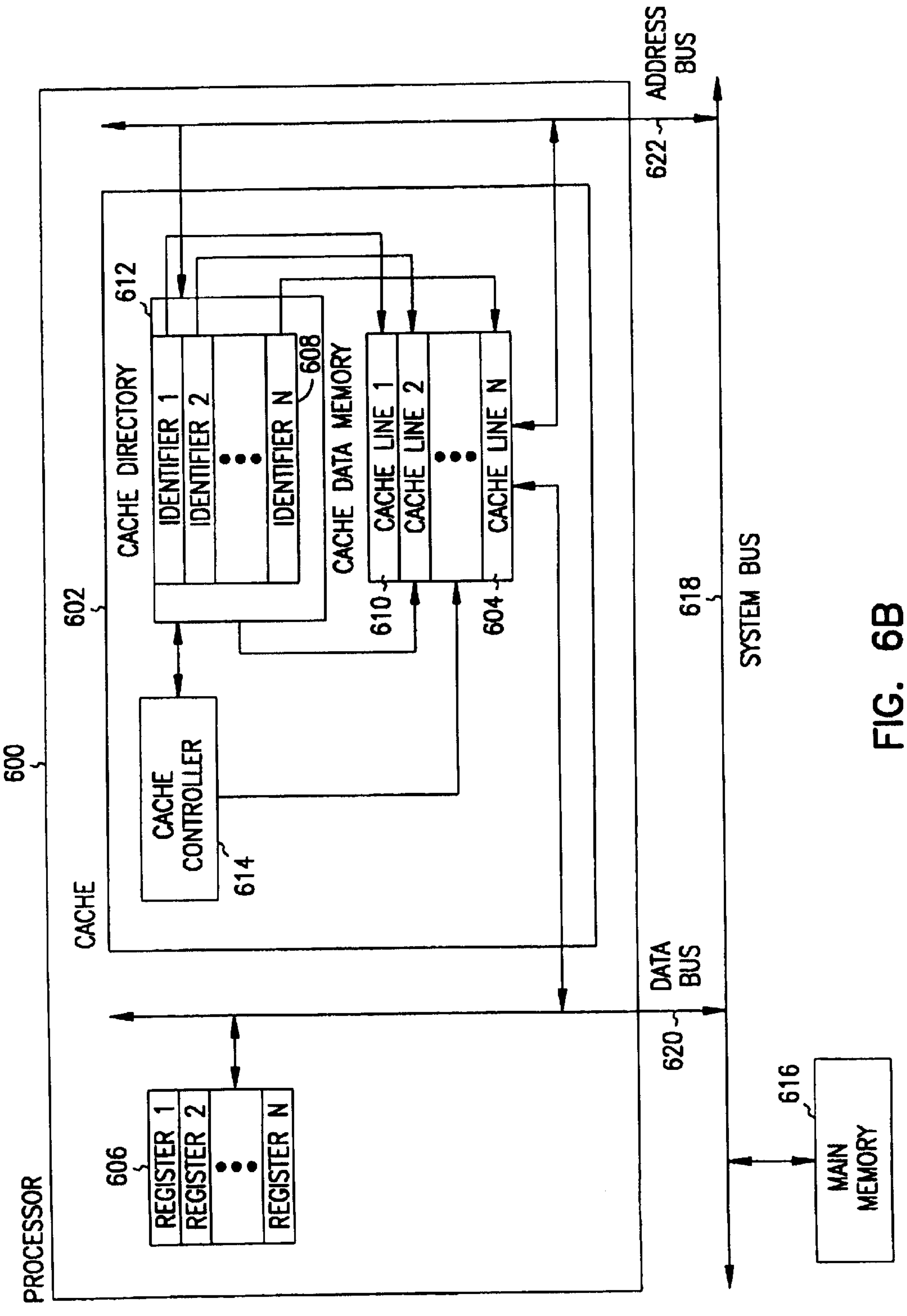
Figure 6C:
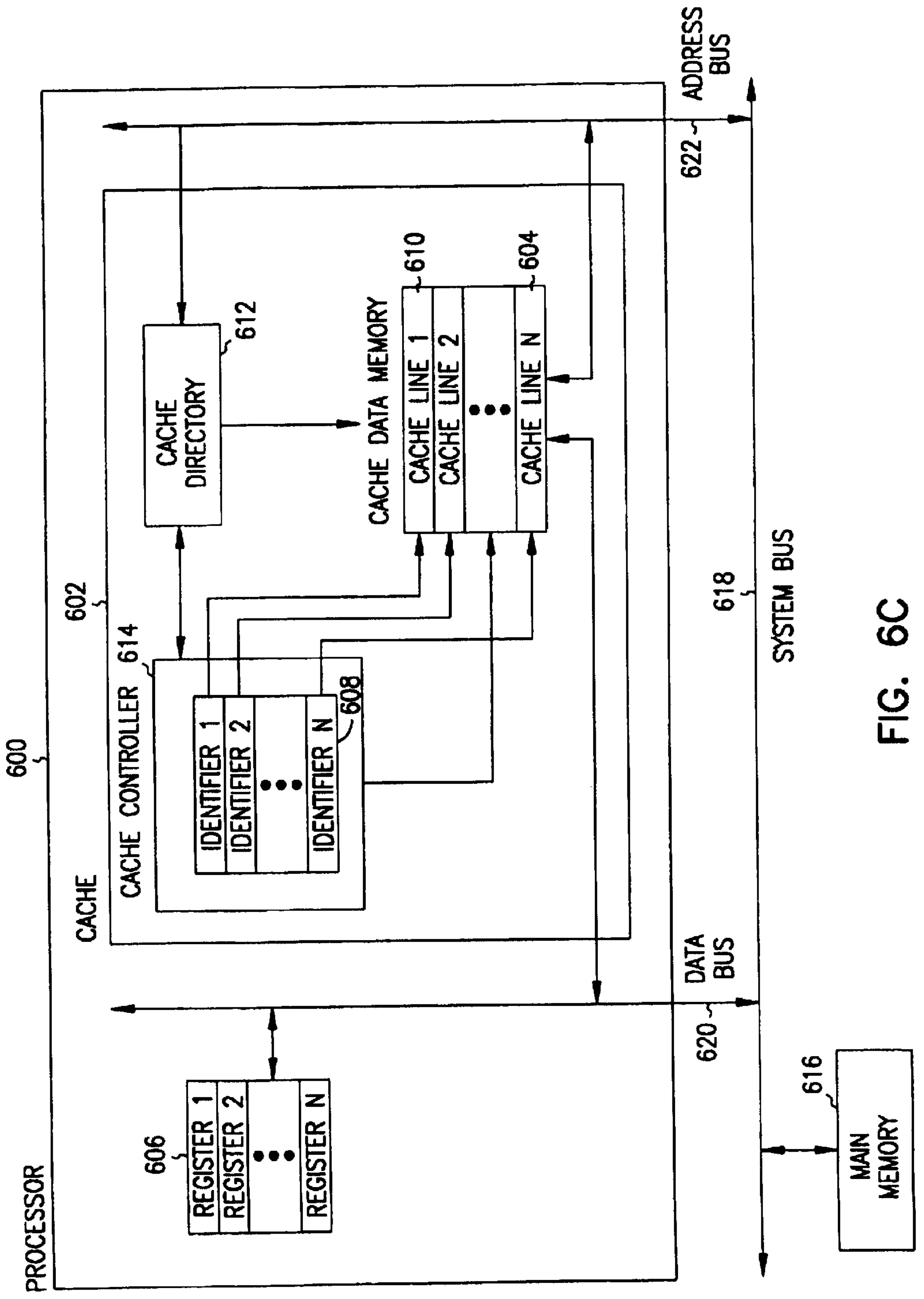

FIGS. 6A–6C show block diagrams of example embodiments of a processor in which embodiments of the present invention may be implemented. FIGS. 6A–6C show a processor 600 with access to a data bus 620 and an address bus 622 that are connected to a system bus 618 providing access to main memory 616. The cache 602 has access to the data bus 620 and the address bus 622. The present invention is not limited to this exemplary system. For example, the present invention may be practiced in other system configurations, such as the systems shown in FIGS. 1, 7 and 8.

One aspect of the present invention, as shown in FIG. 6A, is a processor 600 comprising a cache 602, a plurality of registers 606, circuitry, and a plurality of identifiers 608. The cache 602 has a plurality of cache lines 604. In FIG. 6A, the cache lines 604 are shown in a cache data memory 610, but they may reside elsewhere in some embodiments. Optionally, the cache includes a cache controller 614 and a cache directory 612, in some embodiments. The plurality of registers 606 store data for instructions to be executed by the processor 600. The processor 600 includes circuitry to load data from the cache to the plurality of registers and circuitry to prefetch data during speculative execution and allocate cache lines to store the data. Each identifier 608 is associated with a cache line 604. The identifiers 608 are shown in different locations in FIGS. 6A, 6B, and 6C and may be located elsewhere, in some embodiments. Each identifier indicates whether to protect its associated cache line 604 from premature eviction. Eviction is premature when a cache line is still needed during run-ahead or normal execution. In one embodiment, at least one of the plurality of identifiers indicates whether its associated cache line is still in use. In another embodiment, at least one of the plurality of identifiers indicates whether the associated cache line was allocated during speculative execution and has yet to be touched during normal execution.

In one embodiment shown in FIG. 6B, the cache further comprises a cache data memory 610, and a cache directory 612. Cache data memory 610 includes a plurality of cache lines 604. The cache directory 612 determines hits or misses and stores address tags of corresponding cache lines 604 currently held in the cache data memory 610. In this embodiment, the cache directory 612 stores the identifiers 608. Each of the identifiers 608 is associated with a cache line 604 within the cache data memory 610. Optionally, the cache 602 also includes a cache controller 614, in some embodiments. The cache controller is sometimes called cache management logic.

In one embodiment shown in FIG. 6C, the cache 602 further comprises a cache controller 614 to implement a cache strategy for moving data into and out of the cache data memory 610 and the cache directory 612. An implemented cache strategy becomes the cache's policies. One example of a cache policy is a replacement algorithm. In this embodiment, the cache controller 614 stores the identifiers 608.

Figure 7:
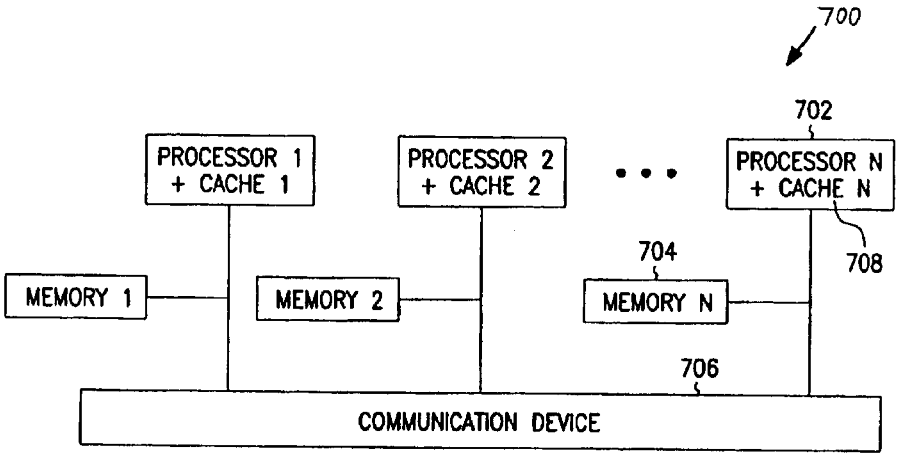
FIGS. 7–10 show block diagrams of example embodiments of a multiprocessor computer system.
Figure 8:
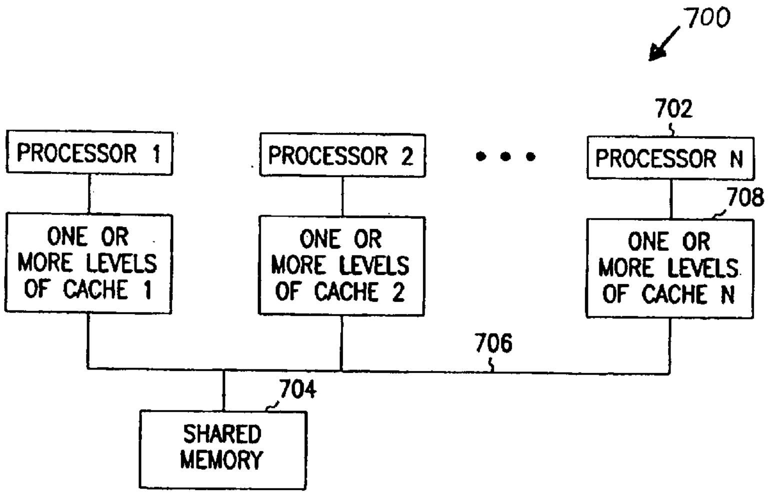

FIGS. 7–10 show block diagrams of example embodiments of a multiprocessor computer system in which embodiments of the present invention may be implemented. FIG. 7 shows a distributed-memory machine 700 having individual nodes containing a processor 702, some memory 704, and an interface to an interconnection network 706 that connects all the nodes. In each node, the processors 702 have an associated cache 708. FIG. 8 shows a centralized shared-memory multiprocessor 700 having multiple processors 702 each with one or more levels of cache 708 sharing the same memory 704 on a bus 706.

Figure 9:
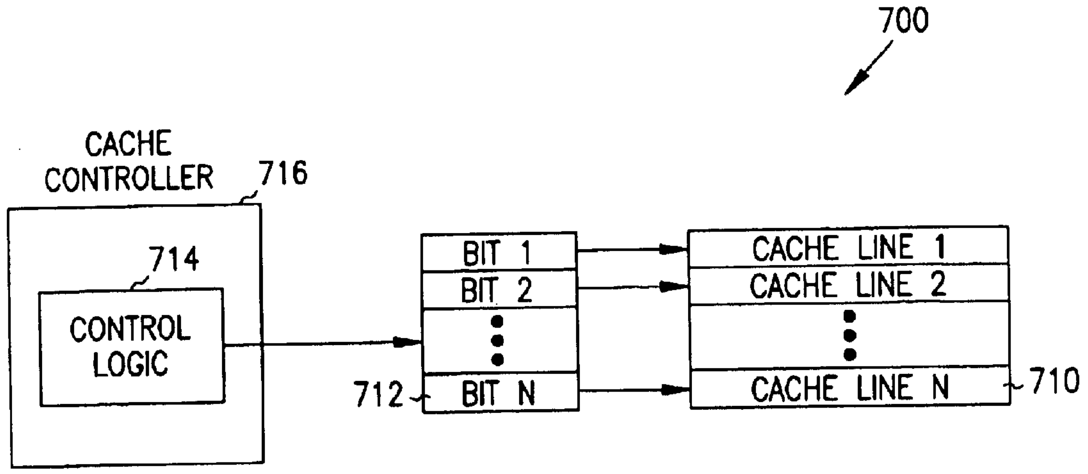
Figure 10:
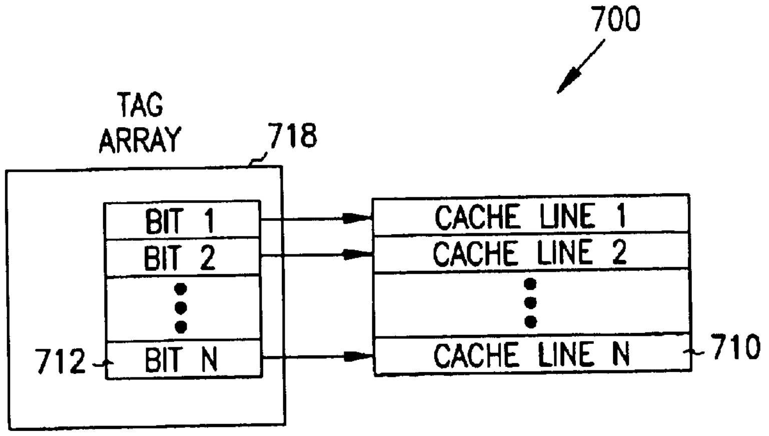

One aspect of the present invention is a multiprocessor computer system 700 (such as the systems shown in FIGS. 7 an 8) comprising a plurality of processors 702, at least one main memory 704, at least one communication device 706, a plurality of caches 708, and a protection bit 712. The protection it 712 is shown in FIGS. 9 and 10. In this embodiment, the plurality of processors 702 each have prefetcher logic and are capable of speculative execution. The at least one communication device 706 couples the plurality of processors 702 to the at least one main memo 704. The communication device 706 may be an interconnection network 706 (as shown in FIG. 7), a bus 706 (as shown in FIG. 8), or any other communication device.

The plurality of caches 708 each have a plurality of cache lines 710 (shown in FIG. 9). As shown in FIGS. 7 and 8, each one of the plurality of caches 708 are associated with one of the plurality of processors 702 (shown in FIGS. 7 and 8). As shown in FIG. 9, a protection bit 712 is associated with each of the cache lines 710 in each of the plurality of caches 708 (shown in FIGS. 7 and 8). Each protection bit 712 protects a cache line 710 from premature eviction during speculative execution.

In one embodiment, the multiprocessor computer system 700 further comprises control logic 714, as shown in FIG. 9. The control logic 714 is associated with the plurality of caches 708 to manage the protection bits.

In one embodiment, the multiprocessor computer system 700 further comprises at least one cache controller 716, as shown in FIG. 9. The at least one cache controller 716 is associated with the plurality of caches 708 (shown in FIGS. 7 and 8). In this embodiment, the control logic 714 resides in the at least one cache controller 716. However, all or part of the control logic 714 may reside elsewhere.

In one embodiment, the multiprocessor computer system 700 further comprises a plurality of tag arrays 718, as shown in FIG. 10. A tag array 718 is associated with each cache 708 (shown in FIGS. 7 and 8). In this embodiment, the protection bits 712 reside in each tag array 718 and are associated with cache lines 710. A tag is the remainder of an address generated by the processor after the set bits have been removed. Set bits are the address used to find a line within a cache. The cache management logic may compare the tag bits of the address with the tag bits of the cache directory which are stored at the same set address.

One aspect of the present invention is a computer system comprising a main memory, a processor, a bus, a cache, and a protection bit. The computer system may be any system including, but not limited to, the systems shown in FIGS. 1, 6A–6C, 7, or 8. The bus connects the main memory and the processor. The cache is associated with the processor and has a plurality of cache lines. The protection bit is associated with each of the cache lines in each of the plurality of caches. Each protection bit protects a cache line from premature eviction during speculative execution. In one embodiment, the cache is a level one (L1) cache and in another embodiment, the cache is a level two (L2) cache. In one embodiment, the L1 cache is on the same chip die as the processor.

It is to be understood that the above description it is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:

executing program instructions from a cache separately in
a normal mode in which only valid instructions having valid results are executed from the cache, and
a run ahead mode in which only future instructions that do not have valid results are speculatively executed from the cache;

determining whether the mode is run ahead execution or normal execution; and upon a cache hit for a first cache line during run ahead execution, setting a protection bit associated with the first cache line.

2. The method as in claim 1, further comprising:

upon a cache miss for a second cache line during run-ahead execution, evicting an unprotected cache line.

3. The method as in claim 2, further comprising:

upon a cache miss for the second cache line during run-ahead execution, replacing the evicted cache line with the second cache line and setting a protection bit associated with the second cache line.

4. The method as in claim 1, further comprising:

upon starting normal execution, clearing all protection bits.

5. The method as in claim 1, further comprising:

upon starting run-ahead execution, clearing all protection bits.

6. A method, comprising:

finding a potential victim in a cache during a run ahead mode separate from a normal execution mode;

determining whether a protection bit is set for the potential victim; and evicting the potential victim only if the protection bit is clear.

7. The method as in claim 6, further comprising:

allocating a cache line into the cache to replace the potential victim; and setting a protection bit associated with the allocated cache line.

8. The method as in claim 7, further comprising:

switching to normal execution;

referencing the allocated cache line; and clearing the protection bit associated with the allocated cache line.

9. A method, comprising:

determining whether a mode is run-ahead execution or normal execution; and upon a cache miss during run-ahead execution, replacing a first cache line only if a protection bit associated with the first cache line is clear.

10. The method as in claim 9, further comprising:

upon a cache hit for a second cache line during run-ahead execution, setting a protection bit associated with the second cache line.

11. The method as in claim 9, further comprising:

upon a cache hit for a second cache line during normal execution, clearing a protection bit associated with the second cache line.

12. A method, comprising:

executing a software prefetching thread concurrently with normal threads in a program on a multithreaded processor, wherein the normal threads execute only valid instructions that produce valid results, and the prefetching thread speculatively executes only future instructions that do not produce valid results;

setting protection bits during execution of the software prefetching thread whenever cache lines are allocated and whenever there is a cache hit, the protection bits protecting cache lines from premature eviction; and clearing protection bits during execution of the normal threads as cache lines allocated for the software prefetching thread are referenced by the normal threads.

13. The method as in claim 12, further comprising:

clearing all protection bits when the software prefetching thread finishes executing.

14. The method as in claim 12, further comprising:

spawning the software prefetching thread for a predetermined section of code in the program.

15. The method as in claim 14, further comprising:

providing code for a software prefetching thread from an optimizing compiler.

16. The processor as in claim 15, the cache further comprising:

a cache data memory; and a cache directory to determine hits or misses and to store address tags of corresponding cache lines currently held in the cache data memory, the cache directory to store the identifiers.

17. The processor as in claim 15, the cache further comprising:

a cache controller to implement a cache strategy for moving data into and out of the cache data memory and the cache directory, the cache controller to store the identifiers.

18. A processor, comprising:

a cache having a plurality of cache lines;

a plurality of registers to store data for instructions to be executed by the processor;

execution logic to execute program instructions separately in a normal mode in which only valid instructions having valid results are executed from the cache, and speculatively in a run ahead mode in which only future instructions that do not have valid results are executed from the cache;

circuitry to prefetch data during the run ahead mode, and to allocate cache lines to store the data; and a plurality of identifiers associated with each cache line, each identifier to indicate whether to protect an associated cache line from premature eviction during the run ahead mode.

19. The processor as in claim 18, wherein at least one of the plurality of identifiers is adapted to indicate whether the, associated cache line is still in use.

20. The processor as in claim 18, wherein at least one of the plurality of identifiers is adapted to indicate whether the associated cache line was allocated during the separate run ahead mode and has yet to be touched during the normal execution mode.

21. A multiprocessor computer system, comprising:

a plurality of processors, each one of the processors having prefetcher logic and being capable of speculative execution during a run ahead mode which executes only invalid instructions and produces invalid results;

at least one main memory;

at least one communication device coupling the plurality of processors to the at least one main memory;

a plurality of caches having a plurality of cache lines, each one of the plurality of caches associated with one of the plurality of processors; and a protection bit associated with each of the cache lines in each of the plurality of caches, each protection bit to protect a cache line from premature eviction during speculative execution.

22. The multiprocessor computer system as in claim 21, further comprising:

control logic associated with the plurality of caches to manage the protection bits.

23. The multiprocessor computer system as in claim 22, further comprising:

at least one cache controller associated with the plurality of caches;

wherein the control logic resides in the at least one cache controller.

24. The multiprocessor computer system as in claim 21, further comprising:

a plurality of tag arrays associated with each cache;

wherein the protection bits reside in each tag array associated with each cache.

25. A computer system, comprising:

a main memory;

a processor having a run ahead mode in which it speculatively executes only future instructions that do not produce valid results, and a separate normal execution mode in which it executes only valid instructions that produce valid results;

a bus to connect the main memory and the processor;

a cache associated with the processor, the cache having a plurality of cache lines; and a protection bit associated with each of the cache lines in each of the plurality of caches, each protection bit to protect a cache line from premature eviction during processor operation in the run ahead mode.

26. The computer system as in claim 25, wherein the cache is a level one (L1) cache.

27. The computer system as in claim 26, wherein the level one (L1) cache is on the same chip die as the processor.

28. The computer system as in claim 25, wherein the cache is a level two (L2) cache.

29. A computer readable storage medium bearing instructions for carrying out a method comprising:

executing program instructions from a cache separately in a normal mode in which only valid instructions having valid results are executed from the cache, and a run ahead mode in which only future instructions that do not have valid results are executed from the cache;

determining whether the mode is run ahead execution or normal execution; and upon a cache hit for a first cache line only during run ahead execution, setting a protection bit associated with the first cache line.

30. The medium as in claim 29, the method further comprising:

upon a cache miss for a second cache line during run-ahead execution, evicting an unprotected cache line.

31. The medium as in claim 30, the method further comprising:

upon a cache miss for the second cache line during run-ahead execution, replacing the evicted cache line with the second cache line and setting a protection bit associated with the second cache line.

* * * * *